(12) United States Patent
Nagai et al.

(10) Patent No.: US 6,408,706 B1
(45) Date of Patent: Jun. 25, 2002

(54) ROTATION STOP DEVICE AND ELECTRIC ACTUATOR HAVING ROTATION STOPPING FUNCTION

(75) Inventors: Shigekazu Nagai, Tokyo; Yousuke Shirai, Ibaraki-ken, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,620

(22) PCT Filed: Nov. 27, 1998

(86) PCT No.: PCT/JP98/05344

§ 371 (c)(1),
(2), (4) Date: Jun. 2, 2000

(87) PCT Pub. No.: WO99/28653

PCT Pub. Date: Jun. 10, 1999

(30) Foreign Application Priority Data

Dec. 2, 1997 (JP) .............................................. 9-331811
Dec. 2, 1997 (JP) .............................................. 9-332222

(51) Int. Cl.[7] .......................... F16H 25/20; B25G 3/28; F16C 29/02
(52) U.S. Cl. .......................... 74/89.33; 384/29; 384/42; 403/359.2
(58) Field of Search .............................. 74/89.23, 89.33; 384/29, 42; 403/359.1, 359.2, 362

(56) References Cited

U.S. PATENT DOCUMENTS

| 272,940 | A | * | 2/1883 | Bergh ........................... 74/440 |
| 1,543,993 | A | * | 6/1925 | Elkington ..................... 74/440 |
| 1,576,369 | A | * | 3/1926 | Schooling ..................... 74/440 |
| 3,399,549 | A | * | 9/1968 | Nagele ......................... 464/97 |
| 5,484,051 | A | * | 1/1996 | Nagai et al. ............... 198/750.7 |
| 5,637,940 | A | * | 6/1997 | Nagai et al. .................. 310/80 |
| 5,809,831 | A | * | 9/1998 | Nagai et al. .................. 74/89.4 |
| 5,836,713 | A | * | 11/1998 | Brassert et al. ........... 403/359.5 |

* cited by examiner

Primary Examiner—Allan D. Herrmann
(74) Attorney, Agent, or Firm—Oblon, Spivak, McClelland, Maier & Neustadt, P.C.

(57) ABSTRACT

A clearance-adjusting mechanism is provided so that a clearance in a circumferential direction between an inner wall surface of a boss section and an outer wall surface of a spline shaft section is adjusted in such a way that a first spline shaft member and a second spline shaft member, which are divided into two, are rotated and displaced in mutually opposite directions about a center of rotation of an axis.

16 Claims, 21 Drawing Sheets

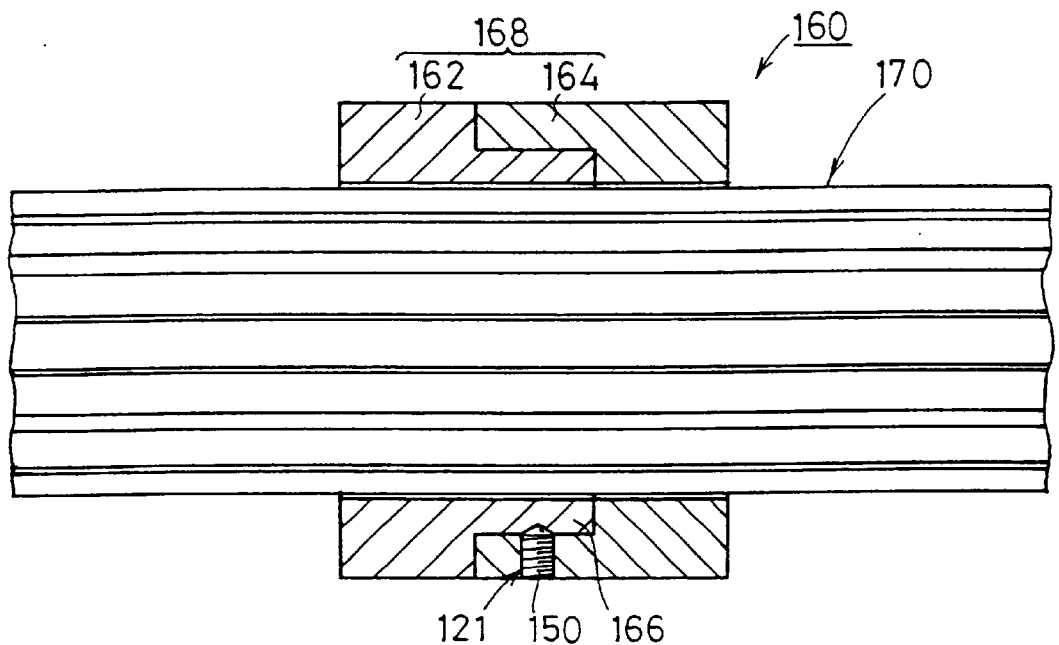
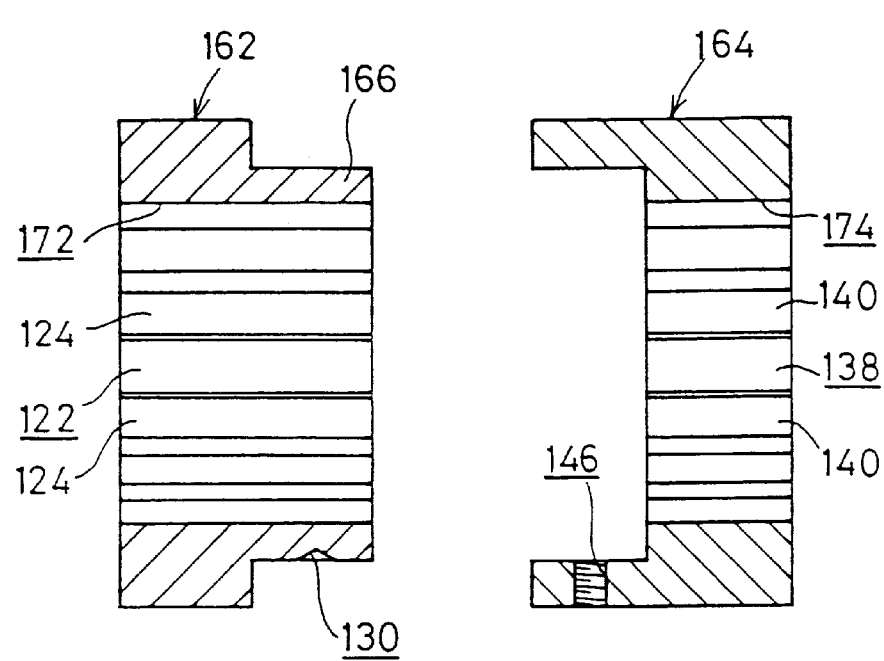

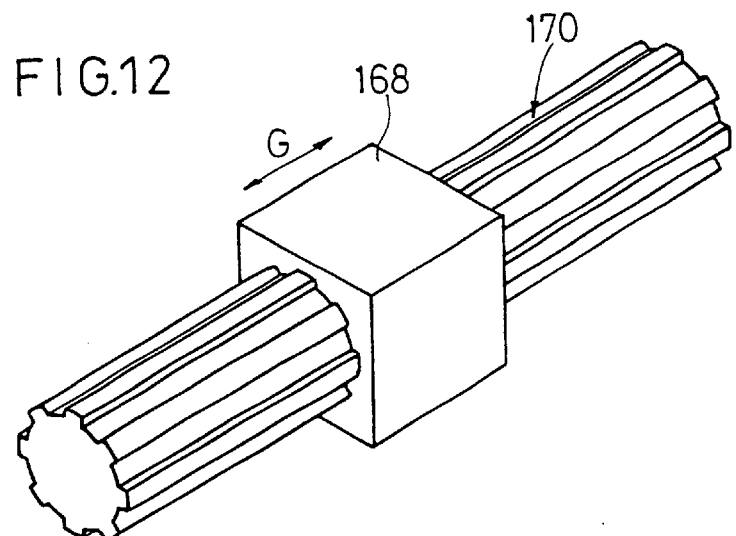
F I G. 12
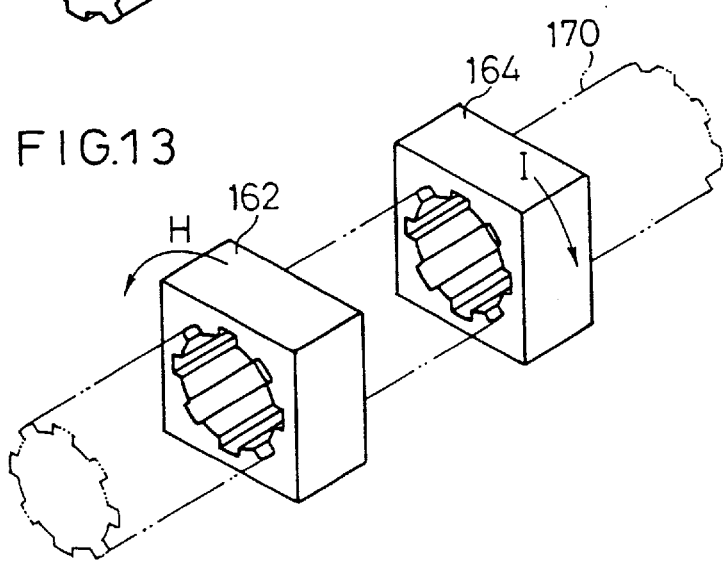
F I G. 13
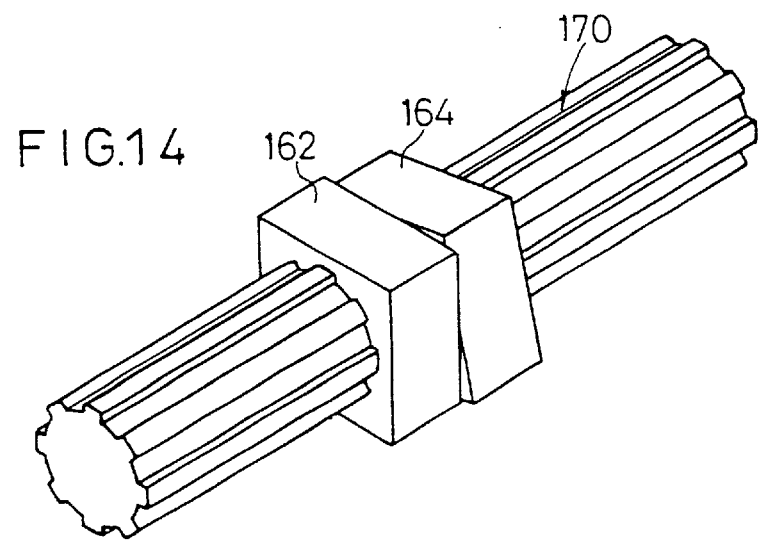
F I G. 14 though the spline shaft from rotation in the circumferential direction by means of engagement of the spline shaft with a hole of a boss.

ROTATION STOP DEVICE AND ELECTRIC ACTUATOR HAVING ROTATION STOPPING FUNCTION

BACKGROUND OF THE INVENTION

1. Field of the Invention

The present invention relates to a rotation-preventive device and an electric actuator having a rotation-preventive function which make it possible to prevent, for example, a spline shaft from rotation in the circumferential direction by means of engagement of the spline shaft with a hole of a boss.

2. Discussion of the Background

For example, a spline has been hitherto used to prevent a shaft member from rotation in the circumferential direction. As shown in FIG. 23, the spline 1 includes a spline shaft 4 which has a plurality of teeth 3a to 3h having a substantially trapezoidal cross section formed in the circumferential direction along the outer circumferential surface between adjoining grooves 2a to 2h separated from each other by a predetermined angle, and a boss 6 which is provided relatively slidably in the axial direction of the spline shaft 4 and which is formed with a hole 5 having a shape corresponding to the cross-sectional shape of the spline shaft 4 in a direction perpendicular to the axis.

In this case, as shown in FIG. 24, a predetermined clearance A is formed between the teeth 3a to 3h of the spline shaft 4 in the circumferential direction and the inner wall surface of the hole 5 of the boss 6 corresponding to the teeth 3a to 3h. The clearance A is formed as follows. That is, the spline shaft 4 is formed, for example, by means of the thread rolling. The boss 6 is formed, for example, by means of the drawing. After that, the finishing machining is applied to the teeth 3a to 3h of the spline shaft 4 and the inner wall surface of the hole 5 of the boss 6.

However, the spline 1 concerning the conventional technique as described above involves the following inconvenience. That is, the clearance A is dispersed due to an error occurring in machining accuracy. Further, the teeth 3a to 3h of the spline shaft 4 are abraded due to the sliding friction with respect to the inner wall surface of the hole 5 of the boss 6, and the clearance A is increased so as to be larger than a preset predetermined value. As a result, backlash is caused when the spline shaft 4 and the boss 6 make the relative sliding displacement in the axial direction.

An electric actuator 10 has been hitherto used as a means for transporting a workpiece. As shown in FIG. 25, the electric actuator 10 comprises a motor 14 which is arranged at one end of a body 12 of the electric actuator 10, and a feed screw 18 which is coupled to a rotary shaft of the motor 14 and which is inserted into a hole 16 of the body 12. A feed nut 20 is meshed with the feed screw 18. The feed nut 20 is secured to one end of a cylindrical member 22. The other end of the cylindrical member 22 is secured to a movable member 24. A guide block 26 is secured to the movable member 24. The guide block 26 is slidably engaged with a guide rail 28.

When the motor 14 is energized in the electric actuator 10, then the feed screw 18 is rotated to move the feed nut 20 in the axial direction of the feed screw 18, and the movable member 24, which is secured to the cylindrical member 22, is linearly displaced. In the electric actuator 10, the guide block 26, which is coupled to the movable member 24, slides along the guide rail 28 which is provided at the outside of the body 12. Thus, the rotation-preventive function is effected to prevent the movable member 24 from rotation together with the feed screw 18.

An electric actuator 30 concerning another conventional technique is shown in FIG. 26. The electric actuator 30 comprises a movable member 32 which is secured to one end of a cylindrical member 22. One end of a guide shaft 34 is secured to the movable member 32 in parallel to the cylindrical member 22. On the other hand, an end plate 36 is secured to one end of a body 12. A bush 38 for inserting the guide shaft 34 therethrough is provided in the end plate 36.

In the electric actuator 30, the guide shaft 34 is guided by the bush 38. Accordingly, the rotation-preventive function is effected to prevent the movable member 32 from rotation together with the feed screw 18.

However, the electric actuators 10, 30 involve the following drawback. That is, the rotation-preventive mechanism for preventing the movable member 24, 32 from rotation is provided at the outside of the body 12. Therefore, the entire shape of the electric actuator 10, 30 becomes large.

In order to realize a compact size, it is conceived that the rotation-preventive mechanism for preventing the movable member from rotation is provided at an inside portion of the body of the electric actuator. For example, as shown in FIG. 27, a ring-shaped guide member 42 is secured to one end of a cylindrical member 22 of an electric actuator 40. A groove 44 is defined on the guide member 42 so that the groove 44 is parallel to the axis of the cylindrical member 22. On the other hand, a rail section 48, with which the groove 44 is slidably engaged, is formed on the wall of a hole 46 of the body 12. When the groove 44 of the guide member 42 makes sliding movement along the rail section 48, the rotation-preventive function is effected to prevent the cylindrical member 22 from rotation.

An electric actuator 50 concerning still another conventional technique is shown in FIG. 28. In the electric actuator 50, a guide member 54, which is formed with a spline 52, is secured to one end of a cylindrical member 22. A spline groove 58, with which the spline 52 is slidably engaged, is formed on the inner wall of a hole 56 defined in a body 12. In the electric actuator 50, the engagement between the spline 52 and the spline groove 58 effects the rotation-preventive function to prevent the cylindrical member 22 from rotation.

An electric actuator 60 concerning still another conventional technique is shown in FIG. 29. The electric actuator 60 comprises a spline 64 which is formed over the entire outer circumference of a lengthy cylindrical member 62. An end plate 66 is secured to an end of a body 12. A spline groove 68, with which the spline 64 is slidably engaged, is formed on the end plate 66. In the electric actuator 60, the engagement between the spline 64 and the spline groove 68 effects the rotation-preventive function to prevent the cylindrical member 62 from rotation.

However, the electric actuators 40, 50, 60, each of which is provided with the rotation-preventive mechanism at the inside of the body 12, require the exclusive part having the specified structure as the rotation-preventive mechanism to prevent the cylindrical member 22, 62 from rotation, including, for example, the guide member 42 formed with the groove 44, the guide member 54 with the spline 52 formed on the outer circumferential surface, and the cylindrical member 62 formed with the spline 64. Therefore, a problem arises in that the production cost of the electric actuators 40, 50, 60 is expensive.

An object of the present invention is to provide a rotation-preventive device which makes it possible to conveniently and freely adjust the clearance in the circumferential direction between teeth of a spline shaft and an inner wall surface of a hole of a boss.

Another object of the present invention is to provide an electric actuator having a rotation-preventive function which makes it possible to reduce the production cost by using parts hitherto used generally so that any exclusive part is unnecessary.

SUMMARY OF THE INVENTION

According to the present invention, a first spline shaft member and a second spline shaft member, which are divided into two, are rotated and displaced in mutually opposite directions about a center of rotation of the axis. Thus, it is possible to freely adjust the clearance in the circumferential direction between an inner wall surface of a boss section and an outer wall surface of a spline shaft section.

Further, a first boss member and a second boss member, which are divided into two, are rotated and displaced in mutually opposite directions about a center of rotation of the axis. Thus, it is possible to freely adjust the clearance in the circumferential direction between an inner wall surface of a boss section and an outer wall surface of a spline shaft section.

According to another aspect of the present invention, a guide rail and a guide block, which have been used as guide means in the conventional technique, are allowed to simultaneously possess the rotation-preventive function. Thus, a displacement member of an electric actuator is prevented from rotation.

In this arrangement, it is preferable that a plurality sets of the guide rails and the guide blocks are provided. By doing so, when a large radial load is applied to a cylindrical member, the load can be supported by the plurality of guide rails and the plurality of guide blocks. Therefore, it is possible to transport a workpiece having a heavy weight, which is preferred.

It is also preferable that a plurality of guide blocks are slidably engaged with the guide rail in the longitudinal direction. By doing so, the radial load, which is applied to the displacement member, can be supported by the plurality of guide blocks in a stable manner. Therefore, it is possible to stably transport a workpiece, which is preferred.

BRIEF DESCRIPTION OF THE DRAWINGS

FIG. 10 shows a partial longitudinal sectional view illustrating a rotation-preventive device according to a second embodiment of the present invention.

FIG. 11 shows a longitudinal sectional view illustrating a first boss member and a second boss member for constructing the rotation-preventive device shown in FIG. 10.

FIG. 12 shows a perspective view to illustrate the basic principle for adjusting the clearance.

FIG. 13 shows a perspective view to illustrate the basic principle for adjusting the clearance.

FIG. 14 illustrates the operation based on the basic principle for adjusting the clearance.

DESCRIPTION OF THE PREFERRED EMBODIMENT

Figure 1:
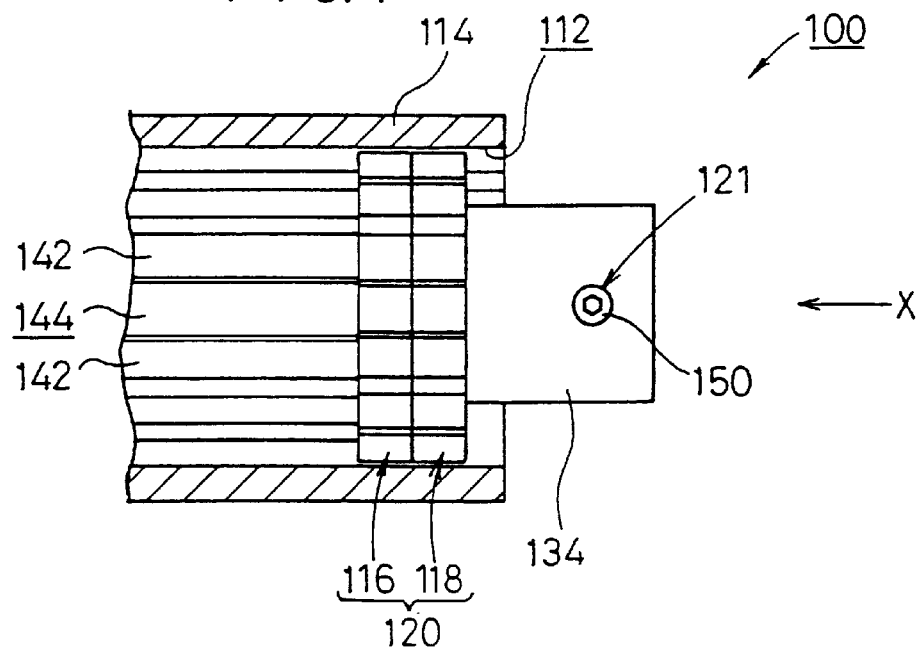
FIG. 1 shows a partial longitudinal sectional view taken in the axial direction, illustrating a rotation-preventive device according to a first embodiment of the present invention.

With reference to FIG. 1, reference numeral 100 indicates a rotation-preventive device according to a first embodiment of the present invention.

The rotation-preventive device 100 comprises a boss section 114 which has a substantially circular cross section and which is formed with a hole 112 penetrating in the axial direction, a spline shaft section 120 which is provided slidably along the hole 112 and which includes a first spline shaft member 116 and a second spline shaft member 118 divided into two and coaxially coupled to one another, and a clearance-adjusting mechanism 121 which adjust the clearance A (see FIG. 3) in the circumferential direction formed between the inner wall surface of the boss section 114 and the outer wall surface of the spline shaft section 120.

Figure 2:
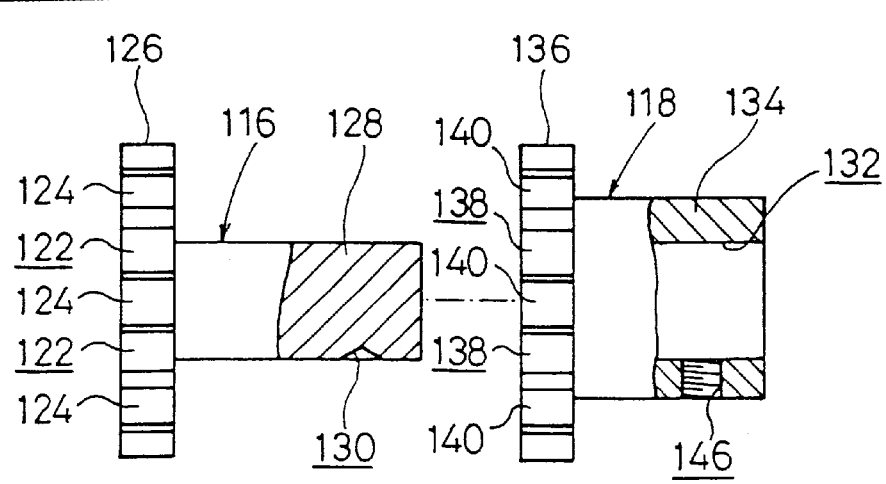
FIG. 2 shows, with partial cutout, a first spline shaft member and a second spline shaft member for constructing the rotation-preventive device shown in FIG. 1.
Figure 3:
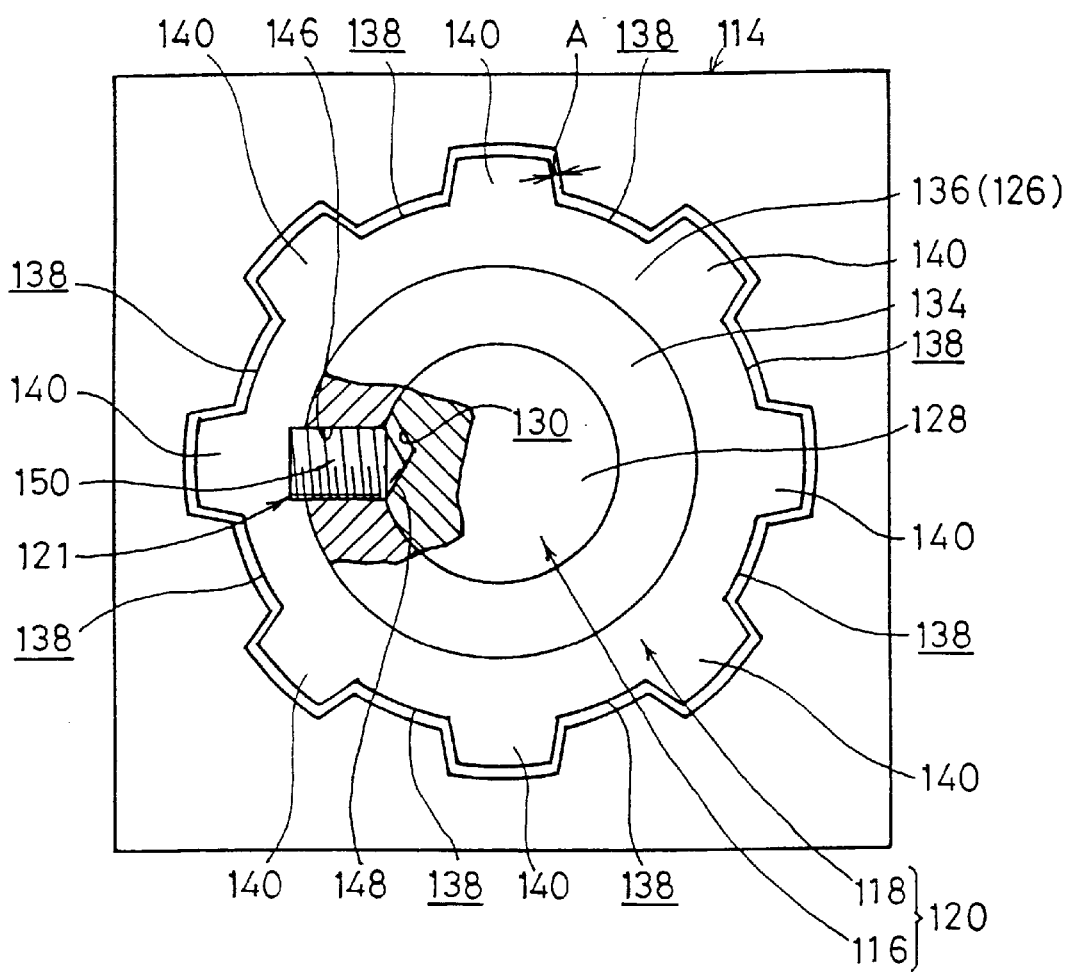
FIG. 3 shows a view as viewed in a direction of the arrow X shown in FIG. 1.

As shown in FIG. 2, the first spline shaft member 116 includes a disk section 126 which has a plurality of first teeth 124 having a substantially trapezoidal cross section formed in the circumferential direction of the outer circumferential surface between adjoining grooves 122 separated from each other by a predetermined angle, and a shaft section 128 which protrudes outwardly from the center of the first plane of the disk section 126. The disk section 126 and the shaft section 128 are formed in an integrated manner. As shown in FIGS. 2 and 3, a recess 130 having a tapered cross section is formed on the shaft section 128.

As shown in FIG. 2, the second spline shaft member 118 includes a cylindrical section 134 which is formed with a hole 132 for inserting and fitting the shaft section 128 of the first spline shaft section 116, and a flange section 136 which is formed at one end of the cylindrical section 134 in the axial direction. The cylindrical section 134 and the flange section 136 are formed in an integrated manner. A plurality of second teeth 140 having a substantially trapezoidal cross section are formed in the circumferential direction on the outer circumferential surface of the flange section 136 between adjoining grooves 138 separated from each other by a predetermined angle.

The first spline shaft member 116 and the second spline shaft member 118 are coaxially coupled to one another by the aid of the shaft section 128 which is inserted and fitted to the hole 132. The diameter of the disk section 126 of the first spline shaft member 116 is substantially the same as the diameter of the flange section 136 of the second spline shaft member 118.

In the first embodiment, the pitch is set to be substantially identical between the first teeth 124 and the second teeth 140 which are formed on the first spline shaft member 116 and the second spline shaft member 118 respectively. However, the present invention is not limited thereto. The pitch may be different between the first teeth 124 and the second teeth 140.

Figure 9:
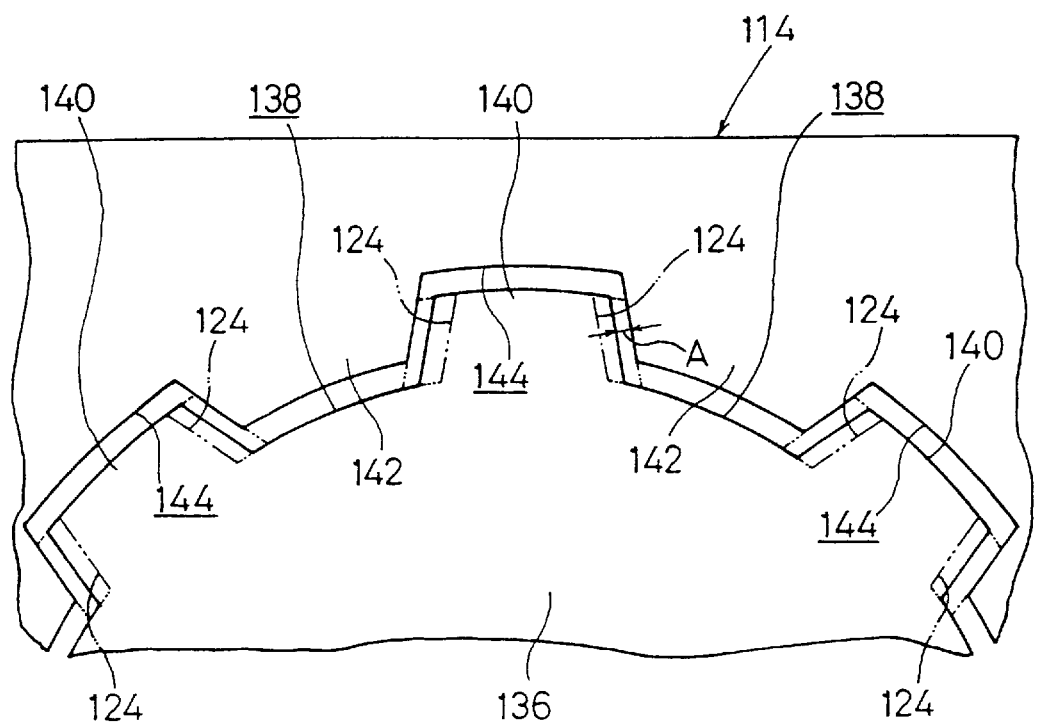
FIG. 9 shows a magnified side view depicting principal parts to illustrate the operation of the clearance-adjusting mechanism.

As shown in FIG. 9, third teeth 142 and grooves 144, which have shapes corresponding to the plurality of grooves 122, 138, the first teeth 124, and the second teeth 140 of the first spline shaft member 116 and the second spline shaft member 118, are formed on the inner circumferential surface of the boss section 114. That is, the third teeth 142 and the grooves 144, which are meshed with the plurality of grooves 122 and the first teeth 124 formed on the outer circumferential surface of the disk section 126 of the first spline shaft member 116 and the grooves 138 and the second teeth 140 formed on the outer circumferential surface of the flange section 136 of the second spline shaft member 118 respectively, are formed on the inner circumferential surface of the boss section 114.

The clearance-adjusting mechanism 121 is provided with a screw member 150 (see FIG. 3) with its forward end 148 which makes abutment against the recess 130 formed on the shaft section 128 of the first spline shaft member 116 by being screwed into a screw hole 146 formed through the cylindrical section 134 of the second spline shaft member 118.

The forward end 148 of the screw member 150 is formed to have a tapered cross section. The forward end 148 of the screw member 150 is displaced in the direction of the arrow B along the inclined surface of the recess 130 (see FIG. 4) by increasing the screwing amount of the screw member 150. Accordingly, the first spline shaft member 116 can be rotated by a predetermined angle in the direction of the arrow C with respect to the second spline shaft member 118. As a result, the first teeth 124 of the first spline shaft member 116 make rotational displacement by the predetermined angle in the identical circumferential direction with respect to the second teeth 140 of the second spline shaft member 118.

Figure 5:
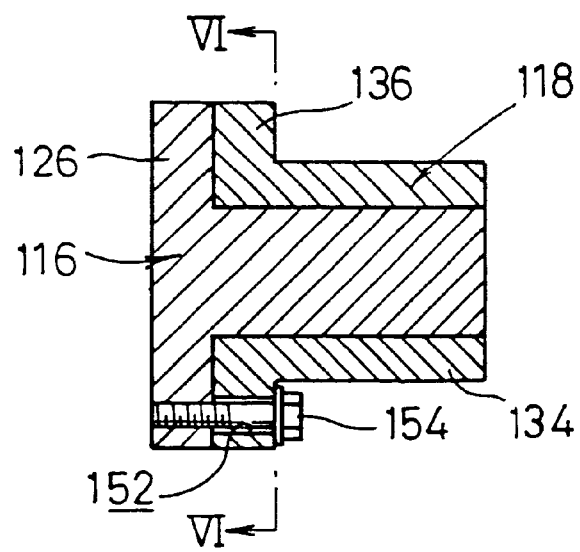
FIG. 5 shows a longitudinal sectional view taken along the axial direction, illustrating the first spline shaft member and the second spline shaft member.
Figure 6:
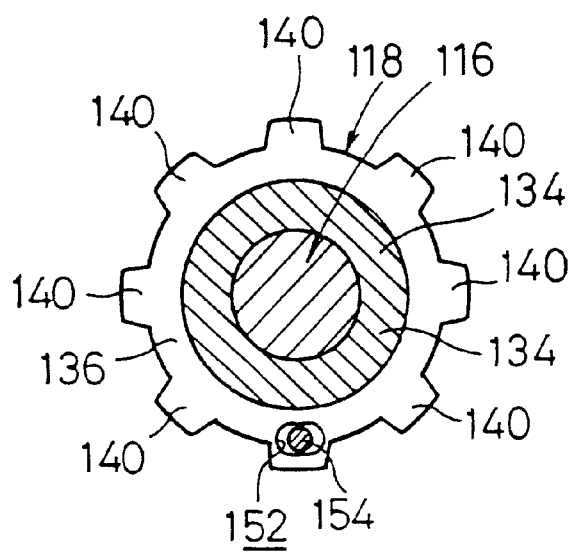
FIG. 6 shows a vertical sectional view taken along a line VI—VI shown in FIG. 5.

As shown in FIGS. 5 and 6, the first spline shaft member 116 and the second spline shaft member 118 are fixed in an integrated manner respectively by the aid of a bolt 154 which is engaged with a long hole 152 having a substantially elliptic configuration formed through the flange section 136.

The rotation-preventive device 100 according to the first embodiment of the present invention is basically constructed as described above. Next, its operation, function, and effect will be explained.

Figure 7:
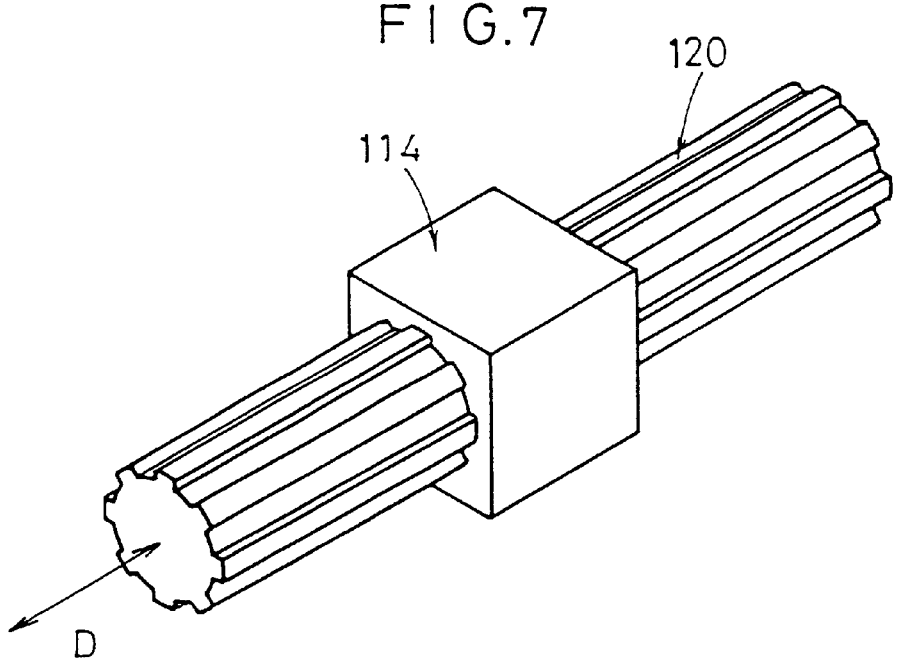
FIG. 7 shows a perspective view to illustrate the basic principle for adjusting the clearance.

At first, as shown in FIG. 7, it is assumed that the spline shaft section 120 is set to be slidable in the axial direction (direction of the arrow D) with respect to the fixed boss section 114. On this assumption, explanation will be made for the basic principle for adjusting the clearance A between the teeth disposed on the side of the spline shaft section 120 and the teeth disposed on the side of the boss section 114.

Figure 8:
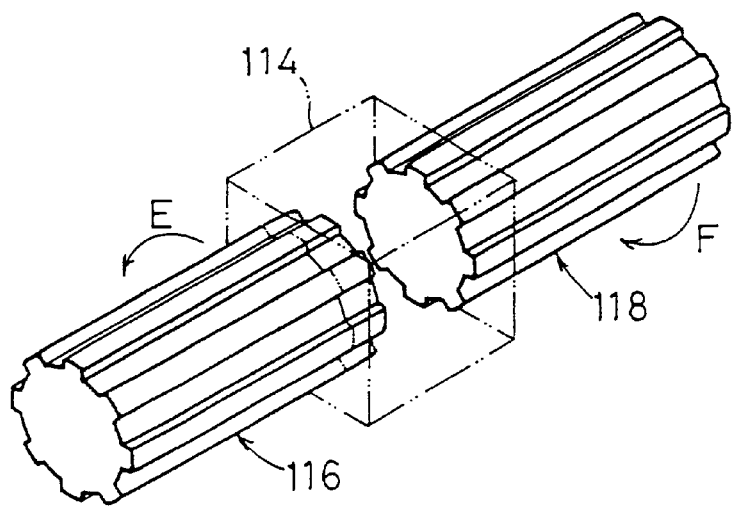
FIG. 8 illustrates the operation based on the basic principle for adjusting the clearance.

As clearly understood from FIG. 8, the spline shaft section 120 is divided into two, and the first spline shaft member 116 and the second spline shaft member 118, which are divided respectively, are allowed to make the rotational displacement by predetermined angles respectively in the mutually opposite circumferential directions (direction of the arrow E and direction of the arrow F) respectively. Thus, it is possible to freely adjust the clearance A between the teeth disposed on the side of the spline shaft section 120 and the teeth disposed on the side of the boss section 114.

Next, explanation will be made for a case in which the clearance A is adjusted on the basis of the first embodiment.

Figure 4:
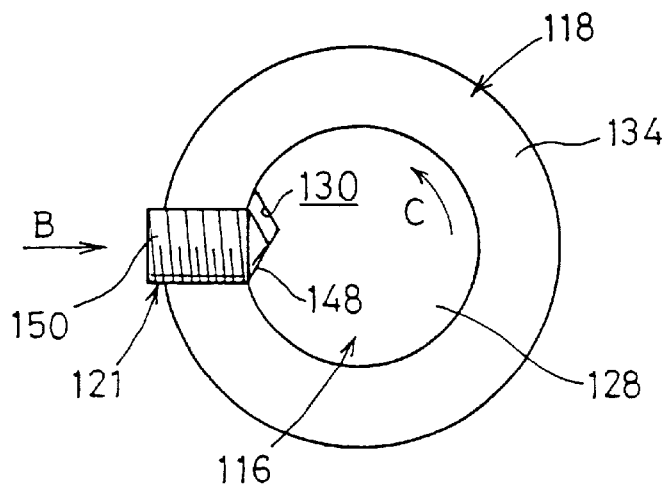
FIG. 4 illustrates the operation of a clearance-adjusting mechanism for constructing the rotation-preventive device shown in FIG. 1.

As shown in FIG. 4, the screwing amount of the screw member 150 is increased so that the forward end 148 of the screw member 150 presses the inclined surface of the recess 130, in the state in which the first spline shaft member 116 and the second spline shaft member 118 are coaxially coupled to one another by the aid of the shaft section 128. Accordingly, the first spline shaft member 116 can be rotated by a predetermined angle in the direction of the arrow C with respect to the second spline shaft member 118.

Therefore, as shown in FIG. 9, the first teeth 124 disposed on the side of the first spline shaft member 116 make the rotational displacement by the predetermined angle in the identical circumferential direction (see two-dot chain lines) with respect to the second teeth 140 disposed on the side of the second spline shaft member 118. Accordingly, the clearance A in the circumferential direction can be freely adjusted with respect to the third teeth 142 formed on the inner wall surface of the boss section 114.

As shown in FIG. 9, as for the clearance A in the circumferential direction between the first and second teeth 124, 140 of the spline shaft section 120 and the third teeth 142 of the boss section 114, it is possible to adjust the clearance A in any one of the positive and negative circumferential directions.

As described above, in the first embodiment, the provision of the clearance-adjusting mechanism 121 makes it possible to avoid the dispersion of the clearance A which would be otherwise caused by any error of machining accuracy. Further, it is possible to avoid the backlash which would be otherwise caused by the sliding friction between the teeth 124, 140 of the spline shaft section 120 and the inner wall surface of the boss section 114.

When the first spline shaft member 116, the second spline shaft member 118, and the boss section 114 are formed, for example, by means of extrusion molding based on the use of a material made of metal such as an aluminum material, then the production steps can be simplified, and the production cost can be reduced, by freely adjusting the clearance A generated between the sliding portions of the outer wall surface of the spline shaft section 120 and the inner wall surface of the boss section 114, by using the clearance-adjusting mechanism 121 described above.

Next, a rotation-preventive device 160 according to a second embodiment of the present invention is shown in FIG. 10. The same constitutive components as those of the rotation-preventive device 100 shown in FIG. 1 are designated by the same reference numerals, detailed explanation of which will be omitted.

The rotation-preventive device 160 according to the second embodiment comprises a boss section 168 which has a first boss member 162 and a second boss member 164 divided into two to be fitted coaxially by the aid of a shaft section 166, a spline shaft section 170, and a screw member 150 which functions as a clearance-adjusting mechanism 121.

A first hole 172 and a second hole 174, which penetrate in the axial direction, are formed at the inside of the first boss member 162 and the second boss member 164. A plurality of grooves 122, 138, first teeth 124, and second teeth 140 are formed on the first hole 172 and the second hole 174 respectively (see FIG. 11).

At first, as shown in FIG. 12, it is assumed that the boss section 168 is set to be slidable in the axial direction (direction of the arrow G) with respect to the fixed spline shaft section 170. On this assumption, explanation will be made for the basic principle for adjusting the clearance A between the teeth disposed on the side of the spline shaft section 170 and the teeth disposed on the side of the boss section 168.

As clearly understood from FIGS. 13 and 14, the boss section 168 is divided into two, and the first boss member 162 and the second boss member 164, which are divided, are allowed to make the rotational displacement by predetermined angles respectively in the mutually opposite circumferential directions (direction of the arrow H and direction of the arrow I) respectively. Thus, it is possible to freely adjust the clearance A between the teeth disposed on the side of the spline shaft section 170 and the teeth disposed on the side of the boss section 168.

Next, explanation will be made for a case in which the clearance A is adjusted on the basis of the second embodiment.

The screwing amount of the screw member 150 is increased so that the forward end 148 of the screw member 150 presses the inclined surface of the recess 130, in the state in which the first boss member 162 and the second boss member 164 are coaxially coupled to one another by the aid of the shaft section 166. Accordingly, the first boss member 162 can be rotated by a predetermined angle in the direction of the arrow C with respect to the second boss member 164.

Figure 15:
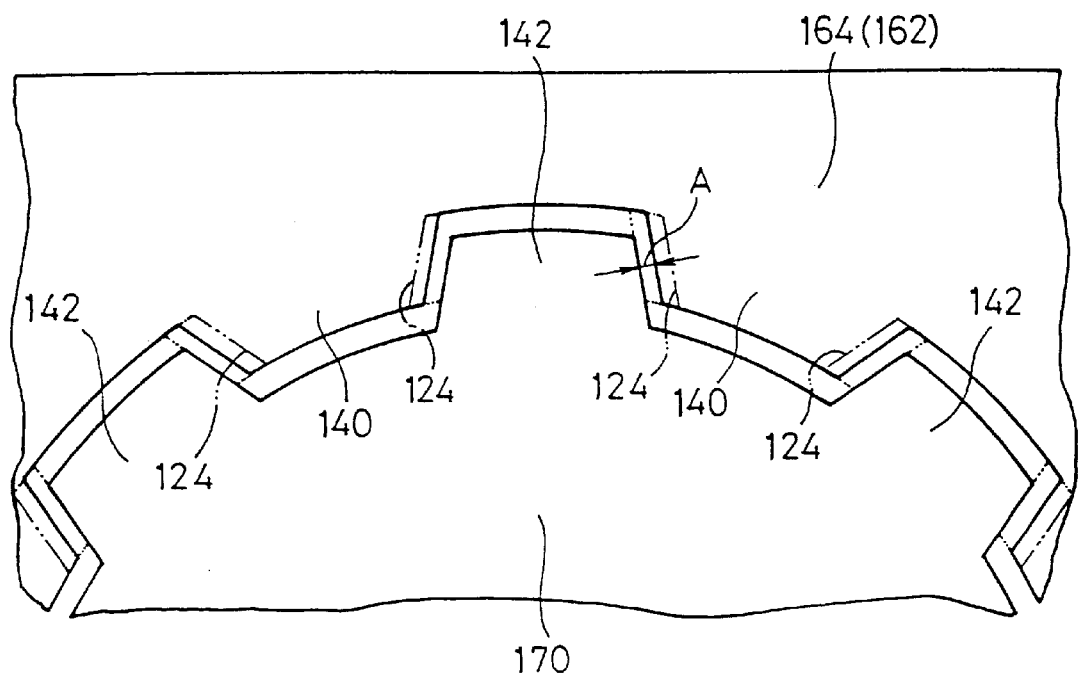
FIG. 15 shows a magnified side view depicting principal parts to illustrate the operation of the clearance-adjusting mechanism.

Therefore, as shown in FIG. 15, the first teeth 124 disposed on the side of the first boss member 162 make the rotational displacement by the predetermined angle in the identical circumferential direction with respect to the second teeth 140 disposed on the side of the second boss member 164 formed on the inner wall surface respectively. Accordingly, the clearance A in the circumferential direction can be freely adjusted with respect to the third teeth 142 formed on the outer wall surface of the spline shaft section 170.

In the first embodiment shown in FIG. 1, the clearance A is adjusted by rotating and displacing, by the predetermined angle, the first teeth 124 or the second teeth 140 provided on the outer wall surface of the spline shaft section 120. On the other hand, the second embodiment is different in that the clearance A is adjusted by rotating and displacing, by the predetermined angle, the third teeth 142 provided on the inner wall surface of the boss section 168. The other function and effect are substantially the same as those of the first embodiment described above, detailed explanation of which is omitted.

Next, the electric actuator having the rotation-preventive function according to the embodiment of the present invention will be explained in detail below.

Figure 16:
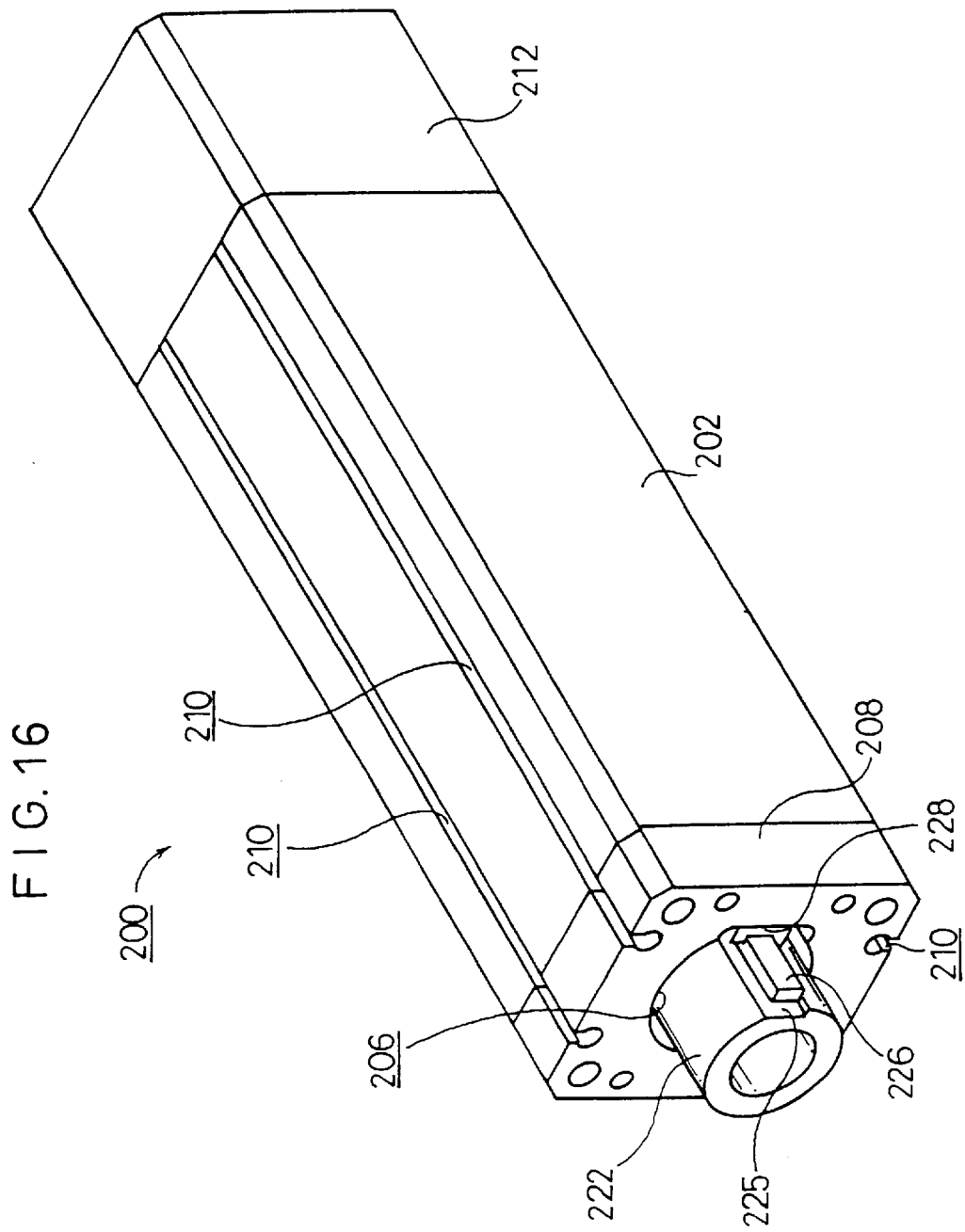
FIG. 16 shows a perspective view illustrating an electric actuator according to a third embodiment of the present invention.

With reference to FIG. 16, reference numeral 200 indicates an electric actuator having the rotation-preventive function (hereinafter simply referred to as "electric actuator") according to a third embodiment of the present invention. The electric actuator 200 includes a lengthy body 202. A hole 204 (see FIG. 17) is formed in the longitudinal direction at the inside of the body 202.

As shown in FIG. 16, an end plate 208 is secured to a first end of the body 202. A hole 206, which communicates with the hole 204, is defined through the end plate 208. A plurality of grooves 210, to which a magnetic detection switch (not shown) for detecting the position is installed, are defined in the longitudinal direction of the body 202 on the outer walls of the body 202 an d the end plate 208. A motor 212 is secured to a second end of the body 202.

Figure 17:
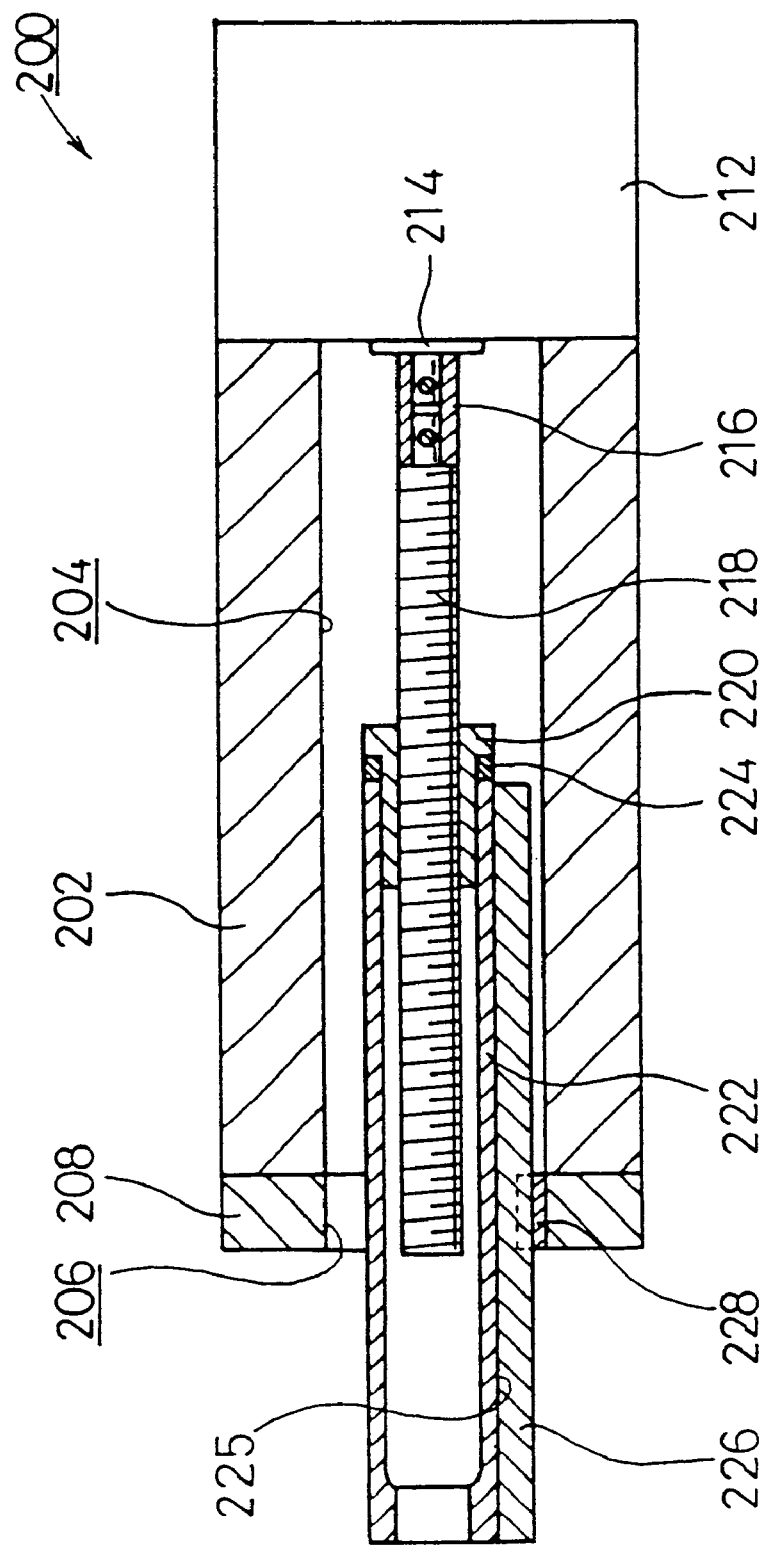
FIG. 17 shows a longitudinal sectional view illustrating the electric actuator shown in FIG. 16.

As shown in FIG. 17, a feed screw 218, which is a driving force-transmitting shaft, is coaxially coupled to a rotary shaft 214 of the motor 212 via a coupling member 216. Therefore, the feed screw 218 is arranged in the longitudinal direction of the hole 204. A feed nut 220 is engaged with the feed screw 218. A cylindrical member 222, which is formed to have a lengthy cylindrical configuration, is secured to the feed nut 220. The cylindrical member 222 surrounds the feed screw 218. A magnet 224, which is fitted to the feed nut 220, is secured to a first end of the cylindrical member 222. An unillustrated table is secured to a second end of the cylindrical member 222, and it is used, for example, to transport a workpiece.

Figure 18:
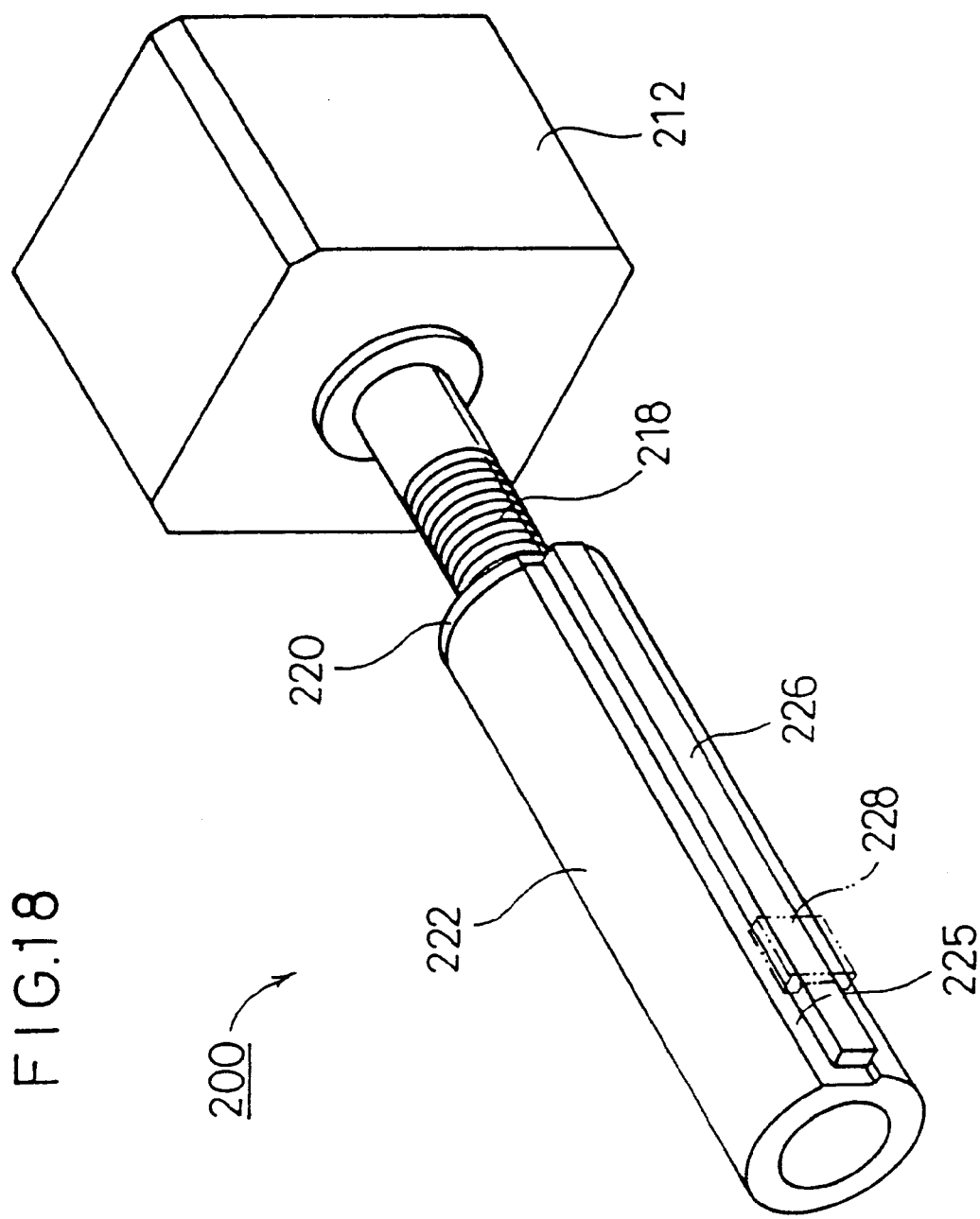
FIG. 18 shows an exploded perspective view illustrating a feed screw and a cylindrical member of the electric actuator shown in FIG. 16.
Figure 19:
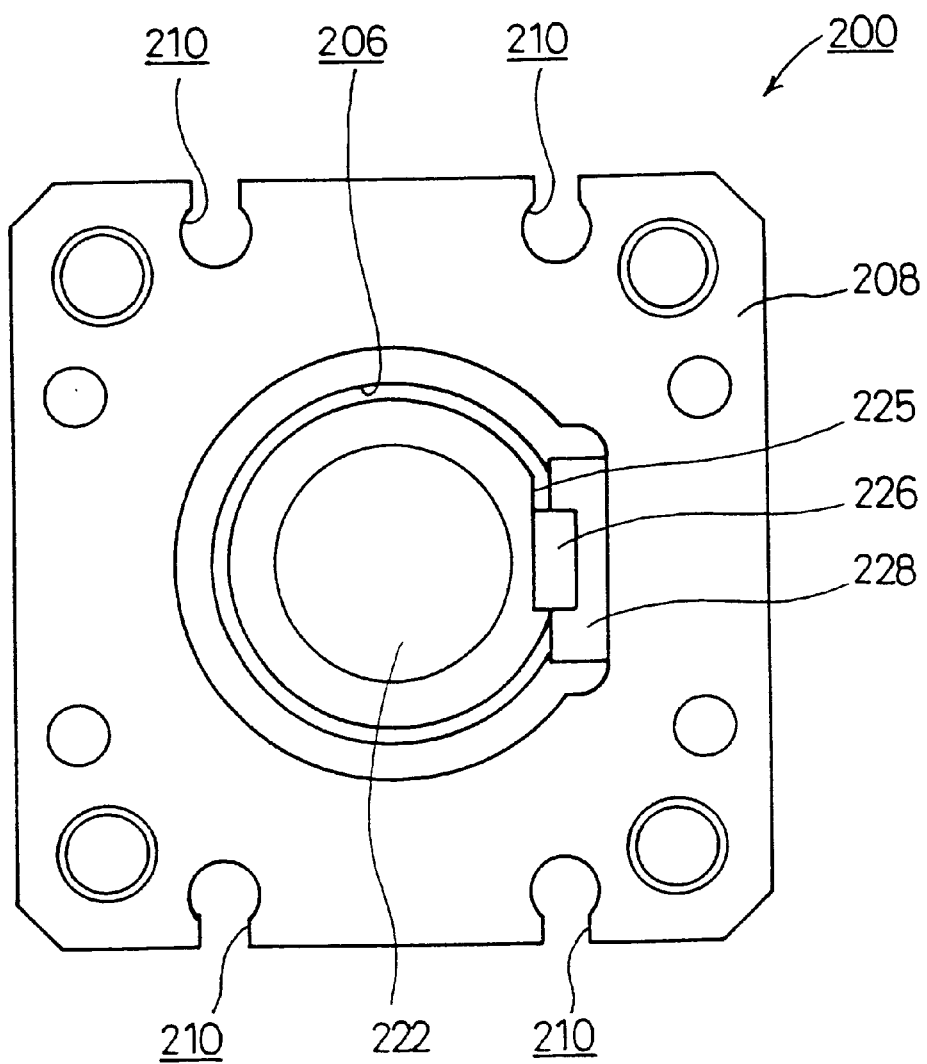
FIG. 19 shows a side view illustrating the electric actuator shown in FIG. 16.

As shown in FIGS. 18 and 19, a flat surface section 225 is formed in the longitudinal direction on the outer wall of the cylindrical member 222. A guide rail 226 is secured to the flat surface section 225. The guide rail 226 is slidably engaged with a guide block 228 which is secured to the wall for constructing the hole 206 of the end plate 208.

In this embodiment, the guide rail 226 and the guide block 228 function as the guide means for linearly guiding the cylindrical member 222 in the longitudinal direction of the body 202, and they function as the rotation-preventive device for preventing the cylindrical member 222 from rotation in the circumferential direction.

The electric actuator 200 according to the third embodiment of the present invention is basically constructed as described above. Next, its operation will be explained.

When the motor 212 is driven by energizing an unillustrated power source, then the rotary shaft 214 is rotated, and the rotary motion is transmitted to the feed screw 218 via the coupling member 216. During this process, the feed nut 220 intends to make rotation together with the feed screw 218. However, the feed nut 220 is prevented from rotation by the aid of the cylindrical member 222, because the guide rail 226 is engaged with the guide block 228. Accordingly, the rotary motion of the motor 212 is converted into the rectilinear motion in accordance with the engagement of threads threaded on the feed screw 218 and the feed nut 220. Thus, the feed nut 220 is linearly displaced. As a result, the cylindrical member 222 is moved in accordance with the rotation of the motor 212. The feed screw 218 is surrounded by the cylindrical member 222, and it is not exposed to the outside. Therefore, it is possible to prevent the feed screw 218 from adhesion of dust or the like.

When the magnet 224 provided on the feed nut 220 approaches the unillustrated magnetic detection switch installed to the groove 210 in accordance with the displacement action of the cylindrical member 222, then the magnetic detection switch senses the magnetism, and an unillustrated control unit, which is connected to the magnetic detection switch, detects the position of the feed nut 220. Therefore, the position of the table (not shown), which is secured to the cylindrical member 222, is detected during the transport.

In the electric actuator 200 shown in FIG. 16, the cylindrical member 222 is prevented from rotation in the circumferential direction by using the guide rail 226 and the guide block 228 which are hitherto generally used as the guide means.

In the electric actuator 200 shown in FIG. 16, the guide rail 226 is provided on the cylindrical member 222, while the guide block 228 is provided on the end plate 208. However, it is also preferable that a guide block is provided on the cylindrical member 222, and a guide rail for making engagement with the guide block is provided on the wall for forming the hole 204 of the body 202.

Figure 20:
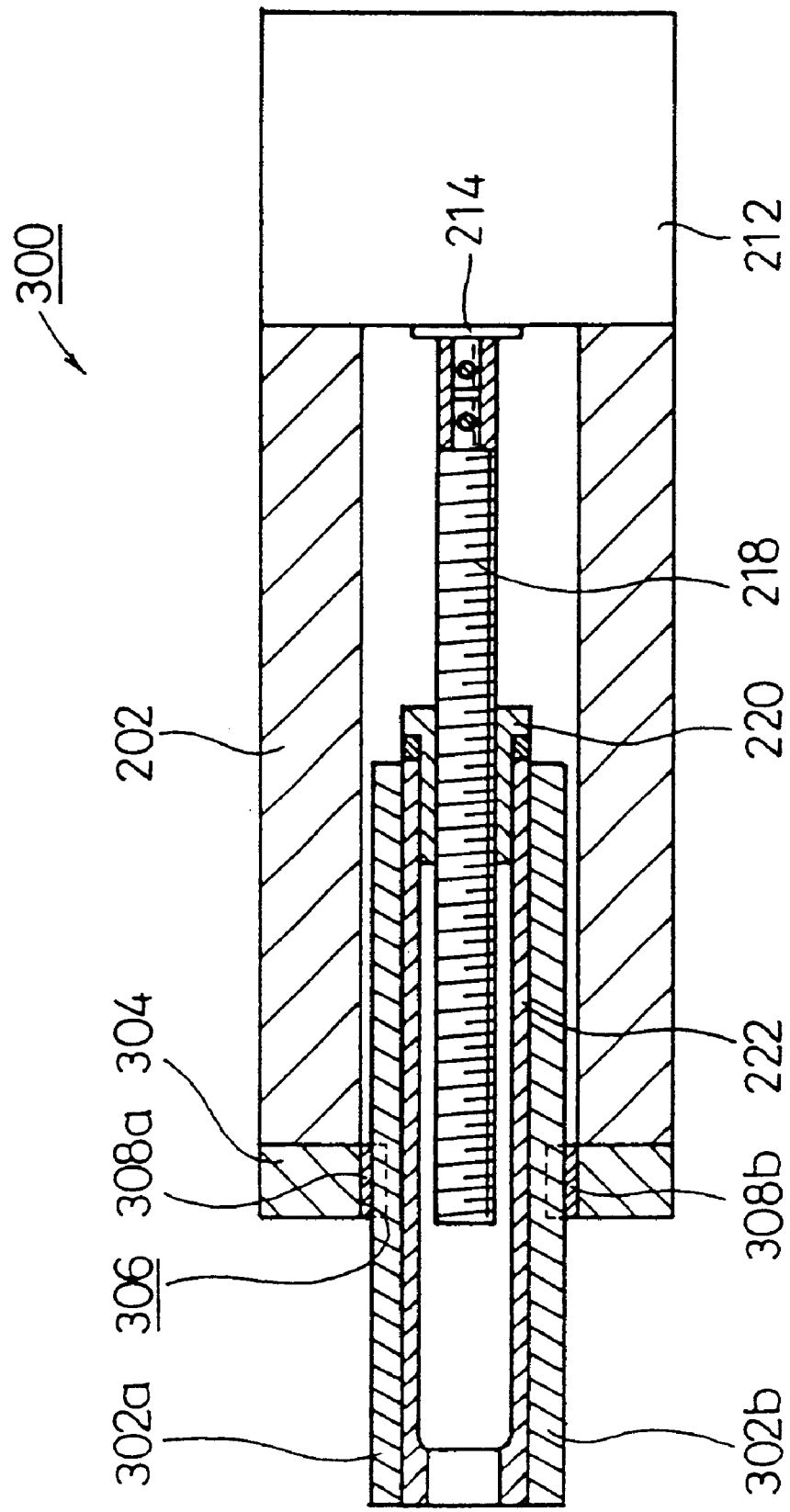
FIG. 20 shows a longitudinal sectional view illustrating an electric actuator according to a fourth embodiment of the present invention.

Next, an electric actuator 300 according to a fourth embodiment of the present invention will be explained with reference to FIG. 20. The same constitutive components as those of the electric actuator 200 shown in FIG. 16 are designated by the same reference numerals, detailed explanation of which will be omitted below.

Two guide rails 302a, 302b are secured in the longitudinal direction to a cylindrical member 222 of the electric actuator 300 according to the fourth embodiment. On the other hand, two guide blocks 308a, 308b, which are slidably engaged with the guide rails 302a, 302b respectively, are secured to the wall for constructing a hole 306 of an end plate 304 secured to an end of a body 202.

When the load of a workpiece is applied in the radial direction to the cylindrical member 222 of the electric actuator 300, the load is supported by the two guide blocks 308a, 308b. Therefore, it is possible to transport the workpiece having a heavy weight by using the electric actuator 300.

Figure 21:
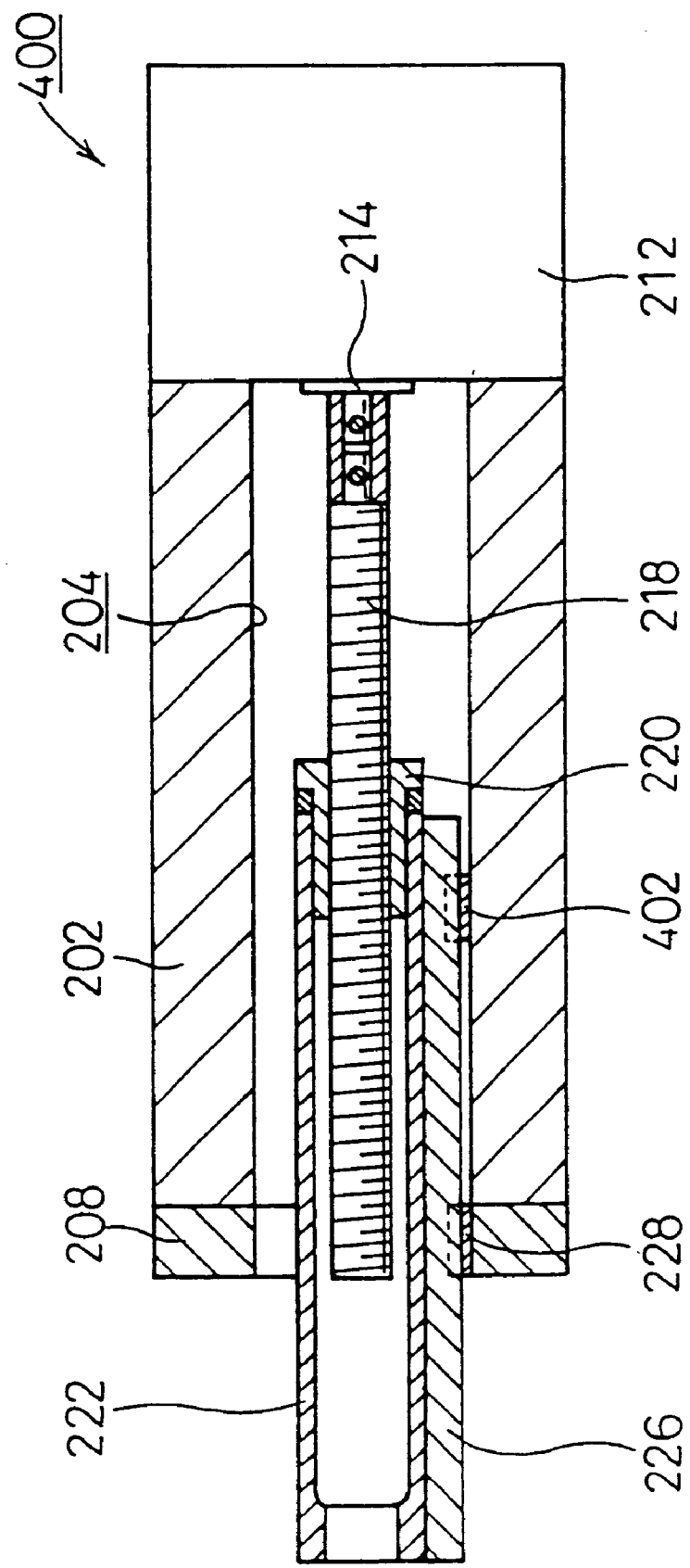
FIG. 21 shows a longitudinal sectional view illustrating an electric actuator according to a fifth embodiment of the present invention.

Next, an electric actuator 400 according to a fifth embodiment of the present invention will be explained with reference to FIGS. 21 and 22.

A guide block 402, which is slidably engaged with the guide rail 226, is secured to the wall for forming the hole 204 of the body 202 of the electric actuator 400 according to the fifth embodiment. Therefore, the two guide blocks 228, 402 are engaged with the guide rail 226.

Figure 22:
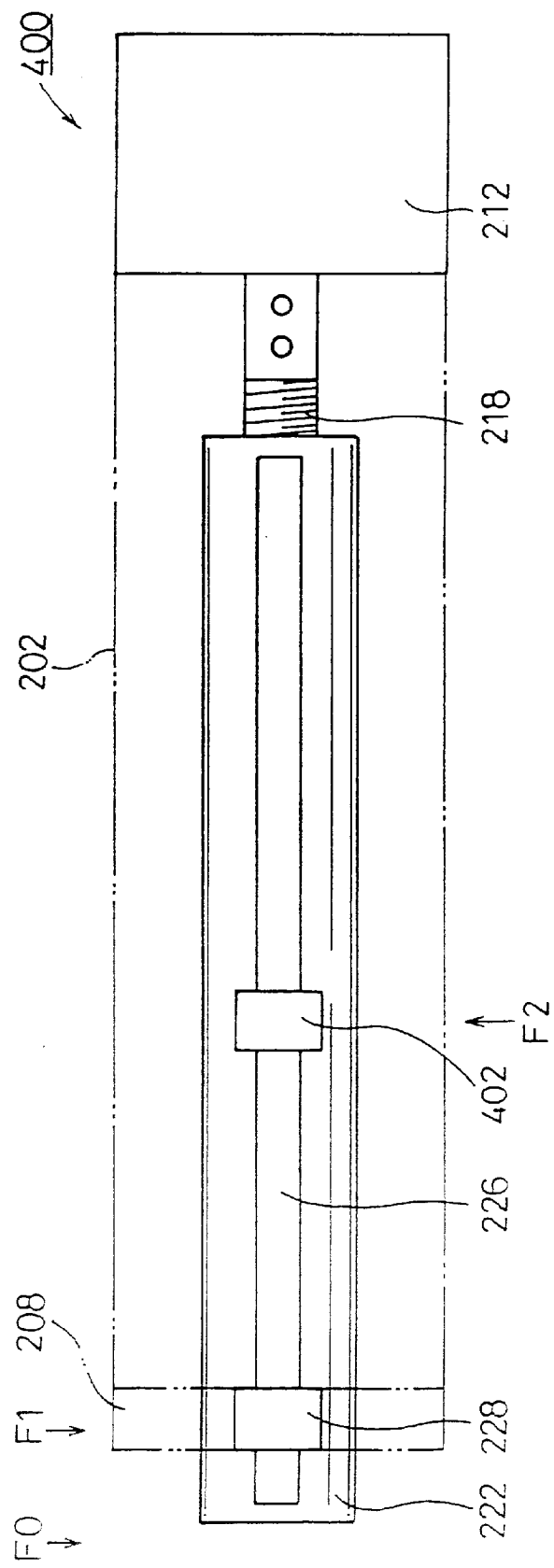
FIG. 22 shows a front view illustrating a cylindrical member and a guide block of the electric actuator shown in FIG. 21.
Figure 23:
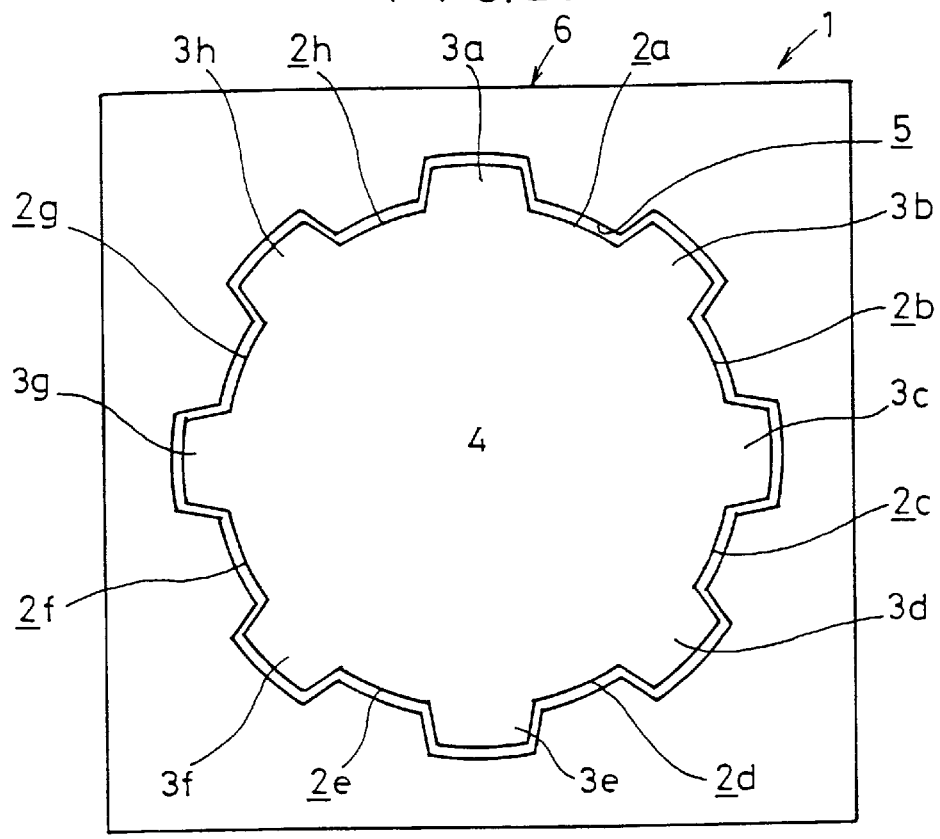
FIG. 23 shows a front view illustrating a spline concerning a conventional technique.
Figure 24:
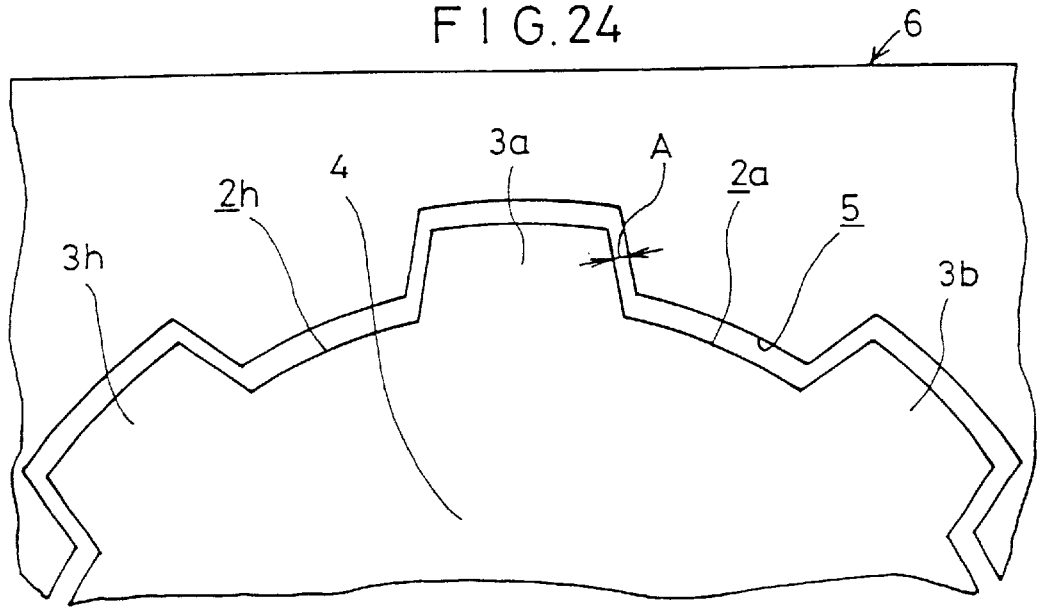
FIG. 24 shows a partial magnified view illustrating the spline shown in FIG. 23.
Figure 25:
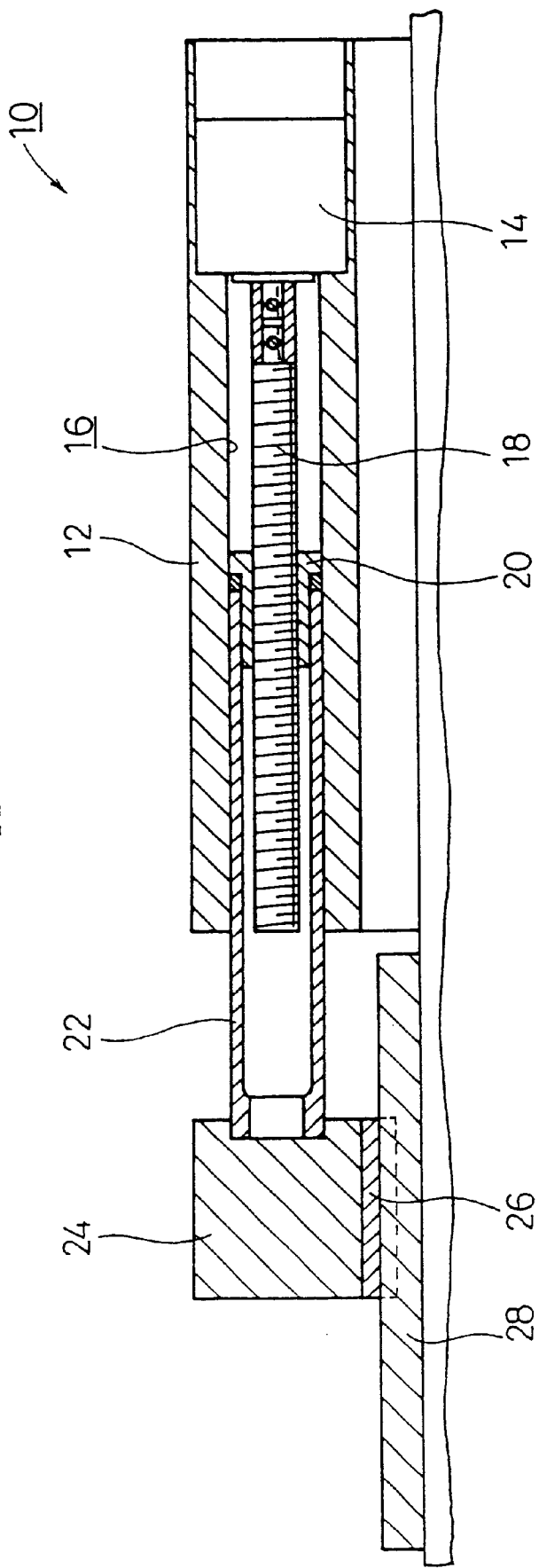
FIG. 25 shows a longitudinal sectional view illustrating an electric actuator concerning a conventional technique.
Figure 26:
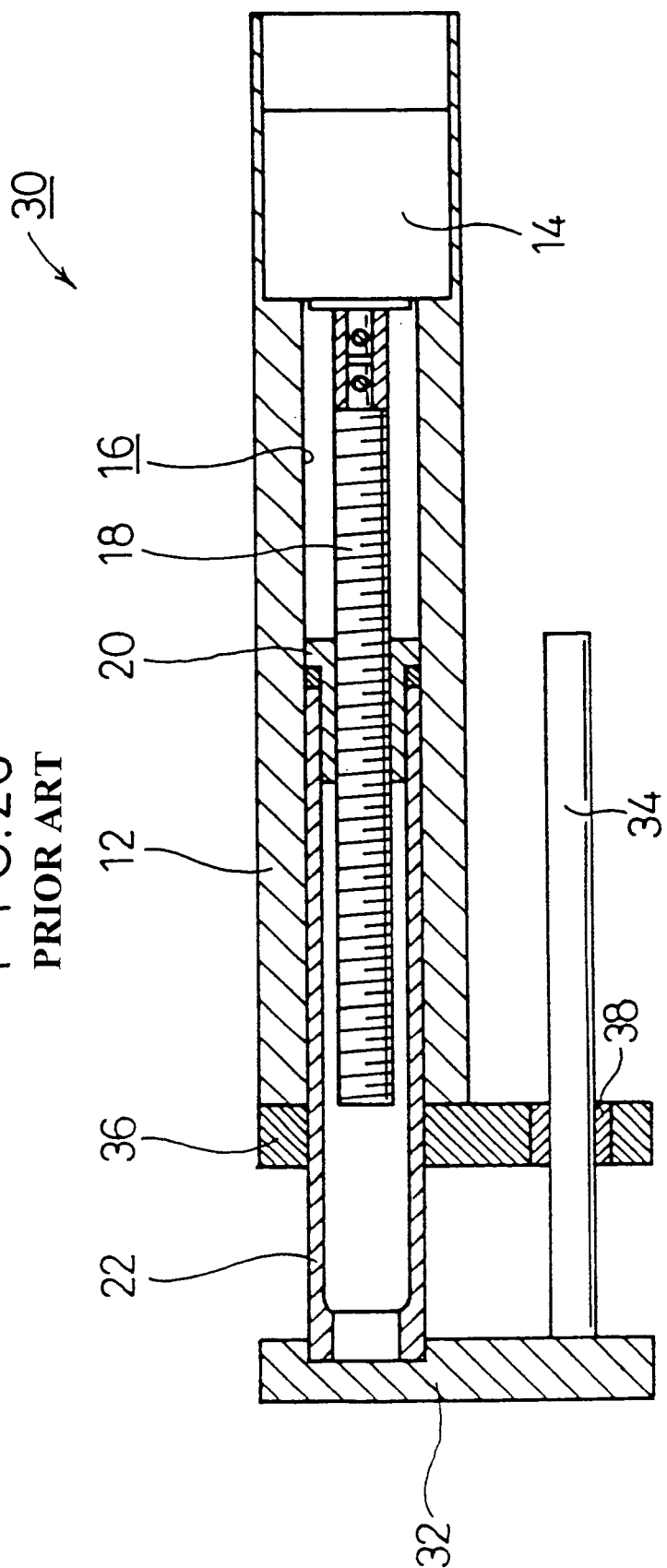
FIG. 26 shows a longitudinal sectional view illustrating an electric actuator concerning another conventional technique.
Figure 27:
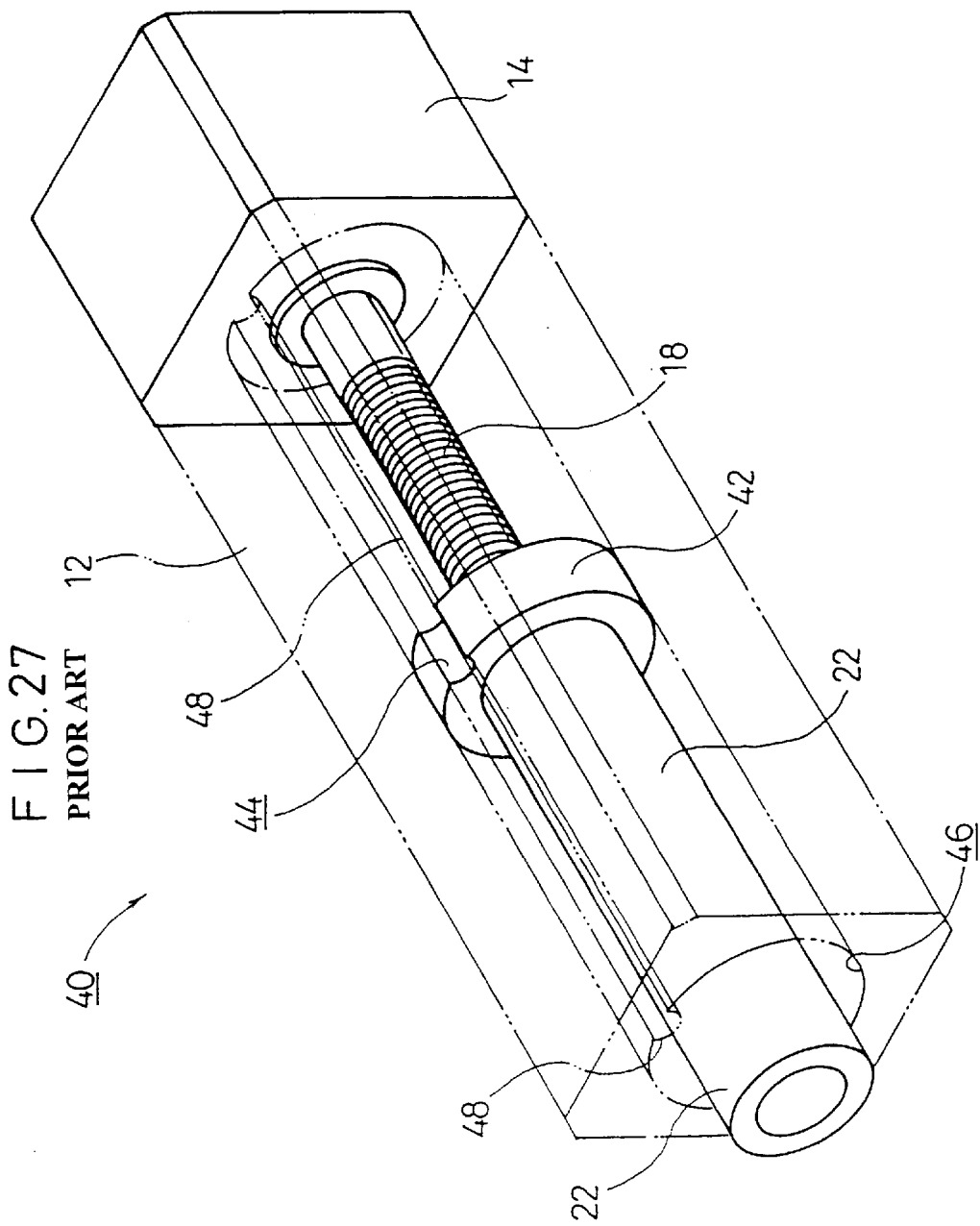
FIG. 27 shows, with partial omission, a perspective view Illustrating an electric actuator concerning still another conventional technique.
Figure 28:
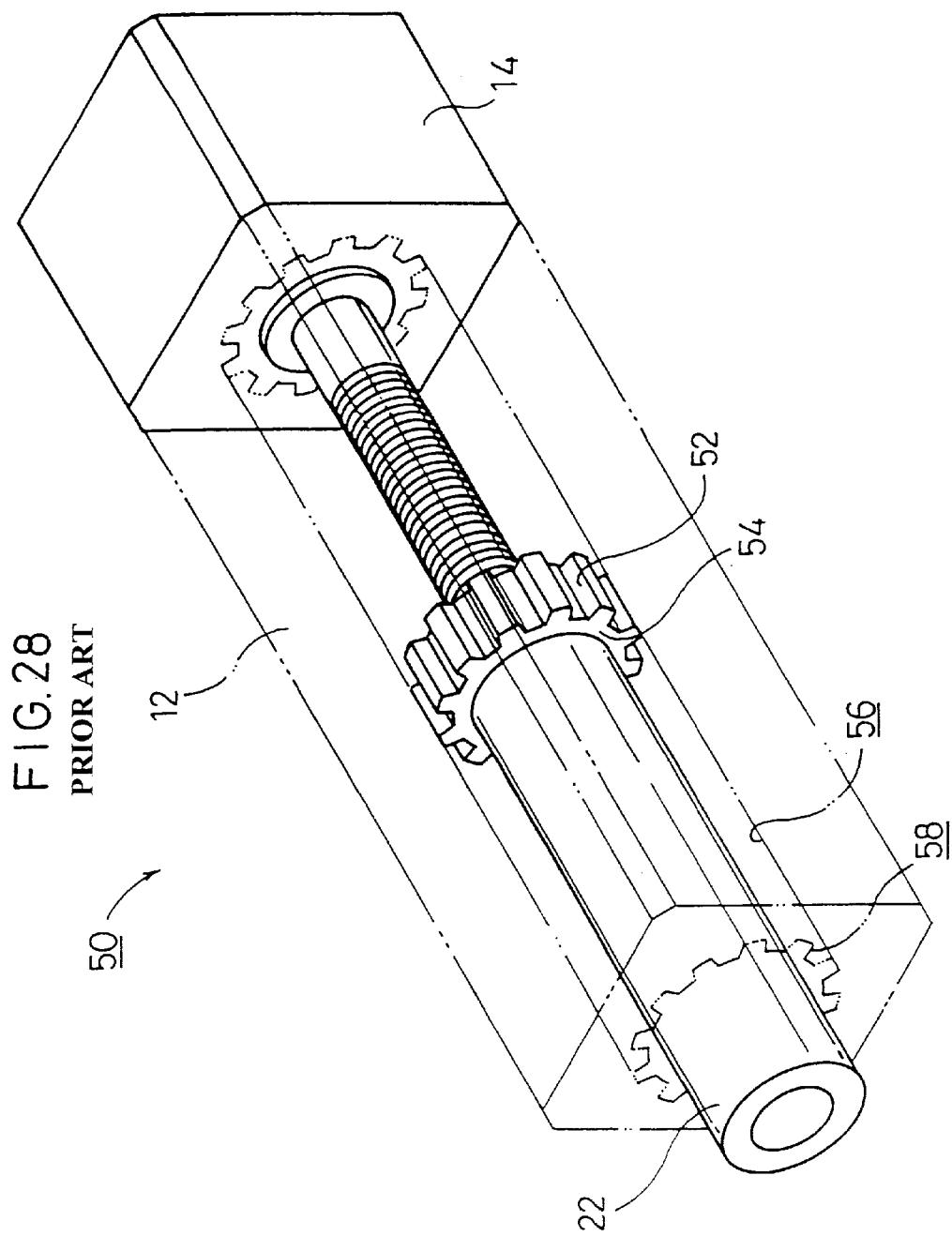
FIG. 28 shows, with partial omission, a perspective view illustrating an electric actuator concerning still another conventional technique.
Figure 29:
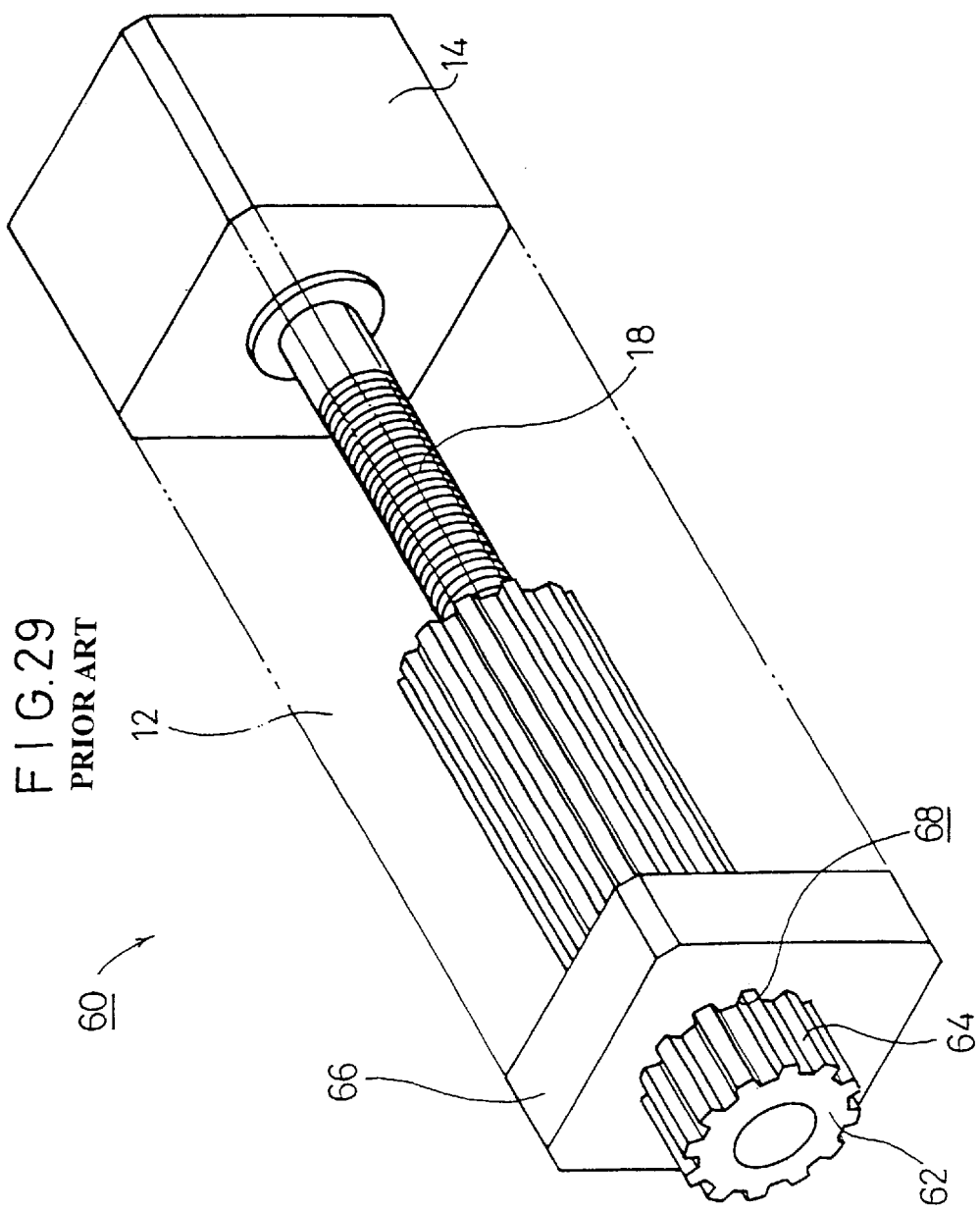
FIG. 29 shows, with partial omission, a perspective view illustrating an electric actuator concerning still another conventional technique.

As shown in FIG. 22, when the load F0 of a workpiece is applied to the end of the cylindrical member 222 of the electric actuator 400, the force F1 is applied to the end plate 208 in the same direction as that of the load F0 of the workpiece. In accordance with this principle, at the inside of the body 202, the force F2 is applied to the cylindrical member 222 in a direction opposite to the load F0 of the workpiece about the supporting point of the guide block 228. Therefore, the guide block 228 supports the force F1, and the guide block 402 supports the force F2. As described above, the load F0 of the workpiece, which is applied to the end of the cylindrical member 222, is supported in a dispersed manner. Accordingly, it is possible to stably transport the workpiece by using the electric actuator 400.

When a plurality of guide rails 226 are provided, and a plurality of guide blocks 228, 402 are slidably engaged with the respective guide rails 226, then it is possible to stably transport the workpiece having a heavy weight, which is preferred.

INDUSTRIAL APPLICABILITY

According to the present invention, the provision of the clearance-adjusting mechanism makes it possible to avoid the dispersion of the clearance which would be otherwise caused by the error of the machining accuracy. Further, it is possible to avoid the backlash which would be otherwise caused by the sliding friction between the spline shaft section and the boss section.

According to the present invention, the displacement member is prevented from rotation by using the guide rail and the guide block having been hitherto generally used. Therefore, it is unnecessary to provide any exclusive part, and it is possible to reduce the production cost of the electric actuator.

In this case, the workpiece having a heavy weight can be transported by using the plurality of guide rails and the plurality of guide blocks. Further, when the arrangement is made such that the plurality of guide blocks are slidably engaged with one guide rail, the load of the workpiece can be supported in the dispersed manner. Thus, it is possible to effect the stable transport function with the electric actuator.

What is claimed is:

1. A rotation-preventive device for preventing rotation during relative sliding movement by making engagement between a boss section which is formed with a hole and a spline shaft section which is inserted into said hole and which is formed with spline grooves, said rotation-preventive device comprising:

a first spine shaft member and a second spline shaft member which are provided coaxially with each other and which are formed by dividing said spline shaft section in a direction substantially perpendicular to an axis thereof; and a clearance-adjusting mechanism for adjusting a clearance in a circumferential direction between an inner wall surface of said boss section and an outer wall surface of said spline shaft section by rotating and displacing said first spline shaft member and said second splint shaft member in mutually opposite directions about a center of rotation of said axis, wherein said spline shaft is slidably disposed in said hole of the boss section after said first spline shaft and said second spline shaft have been rotated and displaced for setting said clearance.

2. The rotation-preventive device according to claim 1, wherein:
said first spline shaft member has a disk section, and a shaft section which protrudes from a flat surface of said disk section in a direction substantially perpendicular thereto;
said second spline shaft member has a cylindrical section which is formed with a hole for inserting said shaft section thereinto, and a flange section which is formed at one end of said cylindrical section in an axial direction; and
a plurality of teeth which have a substantially identical diameter and which are separated from each other by a predetermined angle in said circumferential direction of outer circumferential surfaces, are formed on said disk section and said flange section respectively.

3. The rotation-preventive device according to claim 2, wherein said clearance-adjusting mechanism includes a recess having a tapered cross section formed on said shaft section of said first spline shaft member and a screw member for making abutment against said recess by being screwed into a screw hole formed in said cylindrical section of said second spline shaft member, and one end of said screw member is formed to have a tapered configuration to make engagement with an inclined surface of said recess.

4. The rotation-preventive device according to claim 3, wherein said clearance-adjusting mechanism is provided adjustably for said clearance in any one of positive and negative circumferential directions.

5. The rotation-preventive device according to claim 1, further comprising a fixing means for integrally fixing said first spline shaft member and said second spline shaft member adjusted for said clearance.

6. A rotation-preventive device for preventing rotation by making engagement between a boss section which is formed with a hole and a spline shaft section which is inserted into said hole and which is formed with spline grooves, said rotation-preventive device comprising:
a first boss member and a second boss member which are provided coaxially with each other and which are formed by dividing said boss section in a direction substantially perpendicular to an axis thereof; and
a clearance-adjusting mechanism for adjusting a clearance in a circumferential direction between an inner wall surface of said boss section and an outer wall surface of said spline shaft section by rotating and displacing said first boss member and said second boss member in mutually opposite directions about a center of rotation of said axis.

7. The rotation-preventive device according to claim 6, wherein said first boss member has a shaft section which protrudes along an axis of said spline shaft section, and said first boss member and said second boss member are coupled coaxially and integrally with said shaft section.

8. The rotation-preventive device according to claim 7, wherein said clearance-adjusting mechanism includes a recess having a tapered cross section formed on said shaft section of said first boss member, and a screw member for making abutment against said recess by being screwed into a screw hole formed in said second boss member, and one end of said screw member is formed to have a tapered configuration to make engagement with an inclined surface of said recess.

9. The rotation-preventive device according to claim 8, wherein said clearance-adjusting mechanism is provided adjustably for said clearance in any one of positive and negative circumferential directions.

10. An electric actuator having a rotation-preventive function provided with a tubular displacement member for making linear reciprocating movement by converting rotary motion of a motor into a rectilinear motion by the aid of a driving force-transmitting shaft to prevent said tubular displacement member from rotation in a circumferential direction, said electric actuator comprising:
an actuator body formed with a hole penetrating in an axial direction;
said driving force-transmitting shaft coupled to a rotary shaft of said motor;
said tubular displacement member coupled to said driving force-transmitting shaft, for making linear displacement along said hole of said actuator body;
a guide rail provided on said tubular displacement member in an axial direction substantially along the entire length of said tubular displacement member; and
a guide block provided on said hole of said actuator body, for making slidable engagement with said guide rail.

11. The electric actuator having said rotation-preventive function according to claim 10, wherein a plurality of sets of said guide rails and said guide blocks are provided.

12. The electric actuator having said rotation-preventive function according to claim 10, wherein a plurality of said guide blocks are slidably arranged for said guide rail in a longitudinal direction thereof.

13. The electric actuator having said rotation-preventive function according to claim 10, further comprising:
at least one guide rail provided in said axial direction in said hole of said actuator body; and
at least one guide block provided on said displacement member, for making slidable engagement with said at least one guide rail.

14. The electric actuator having said rotation-preventive function according to claim 13, wherein said at least one guide rail comprises a plurality of sets of said at least one guide rail and said at least one guide block.

15. The electric actuator having said rotation-preventive function according to claim 13, wherein a plurality of said at least one guide block are slidably arranged for at least one guide rail in a longitudinal direction thereof.

16. A rotation-preventive device for preventing rotation during relative sliding movement by making engagement between a boss section which is formed with a hole and a spline shaft section which is inserted into said hole and which is formed with spline grooves, said rotation-preventive device comprising:
a first spine shaft member and a second spline shaft member which are provided coaxially with each other and which are formed by dividing said spline shaft section in a direction substantially perpendicular to an axis thereof; and
clearance-adjusting means for adjusting a clearance in a circumferential direction between an inner wall surface of said boss section and an outer wall surface of said spline shaft section by rotating and displacing said first spline shaft member and said second splint shaft member in mutually opposite directions about a center of rotation of said axis, wherein said spline shaft is slidably disposed in said hole of the boss section after said first spline shaft and said second spline shaft have been rotated and displaced for setting said clearance.

* * * * *